Patented Oct. 28, 1947

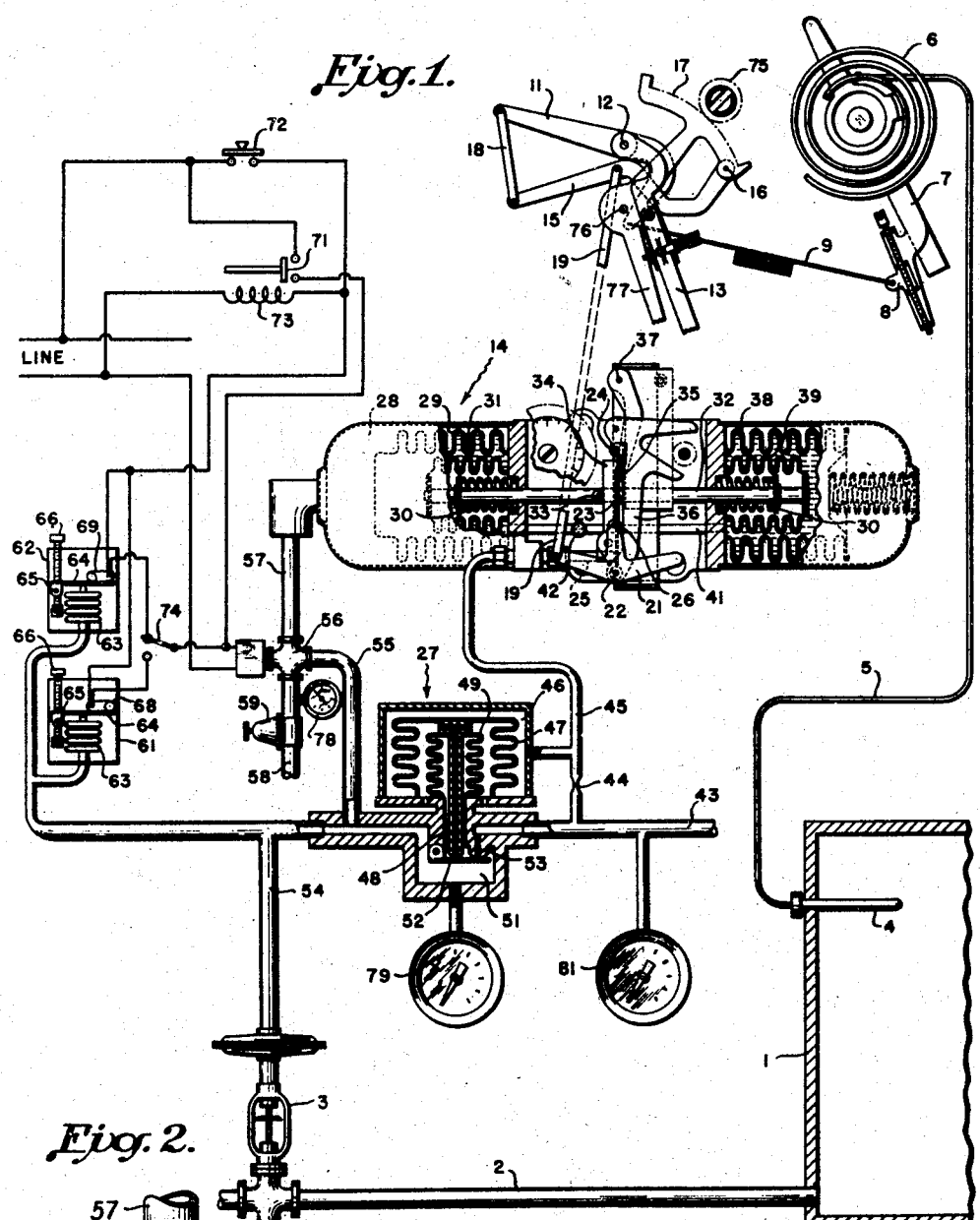

2,429,695

UNITED STATES PATENT OFFICE 2,429,695

CONTROL SYSTEM

William L. McGrath, Syracuse, N. Y., assignor to The Brown Instrument Company, Philadelphia, Pa., a corporation of Pennsylvania Application December 17, 1943, Serial No. 514,621

8 Claims. (Cl. 236—82)

The present invention relates to air control systems, and more particularly to an air control system in which provision is made to prevent hunting and overshooting of the condition when the value at which it is being controlled, or its control point, is changed.

In temperature control systems, for example, in which an air control instrument having automatic reset provisions is used a serious problem arises on applications where it is necessary to change temperatures from one control point to a second control point frequently. With an automatic reset instrument, when the control point is changed to a new value, the output air pressure of the instrument will tend to fall off to zero or build up to a maximum, depending upon whether the control point is raised or lowered. During the period in which the controlled condition is changing from its old to its new value, the reset mechanism is acting to shift the throttling range with respect to the control point in a direction to correct the condition value. When the new value of the condition is finally reached, the throttling range is all on one side of the control point with a result that the condition overshoots the control point. In some cases it may take as long as several hours for the reset provisions to return the condition to the control point where it belongs, and considerable variation and fluctuation will occur during the leveling out process.

It is an object of the present invention to provide a control system in which the above mentioned difficulty is overcome. This is accomplished by applying a predetermined and fixed pressure to the follow-up and reset provisions of the air control system, which pressure is substantially equal to that which the system will ultimately apply to the control valve, each time the control point is altered. At the same time the controlled air pressure is cut off from the follow-up and reset provisions until the controlled pressure reaches a value substantially equal to the predetermined pressure. The controlled pressure is then applied to the instrument, and since the throttling range is then equally spaced on each side of the control point the condition will be held at that point without appreciable overshooting.

In the following description temperature is used as the variable condition being controlled, by way of example only. It will be obvious to those skilled in the art that other conditions such as liquid level, pressure and flow may be controlled in the same manner.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Figure 1 is a view, partially in section, of the control system as a whole, and

Figure 2 is a sectional view of a three way valve used in the control system.

As shown in the drawing, there is a heater 1 which is supplied with a heating medium through a pipe 2, the flow in which is controlled by a pneumatic valve 3 that is located in the pipe. Located in the heater is a temperature responsive bulb 4 that forms part of a measuring system including this bulb, a capillary tube 5 and a spiral Bourdon tube 6. The bulb and spiral are filled with a substance which expands upon an increase in temperature so that as the temperature of the heater 1 increases, the spiral will be unwound to move a bracket member 7 which is attached thereto toward the right. Movement of the bracket serves to operate the control instrument of the present invention. To this end the bracket is provided with an adjustable connection 8 to which is fastened one end of a link 9, the other end of which is attached to a lever 11 that is mounted on a pivoted shaft 12. Also attached to the shaft 12 is a pen arm 13 which is adapted to move across a chart, not shown, so that a pen on the lower end of the arm 13 will make a record of the value of the temperature in the heater 1.

Movement of the lever 11 also serves to adjust the control unit 14 which may take the form of the well known commercial air control instrument of the type shown in Moore Patent 2,112,081, granted on March 22, 1938. The adjustment of the control unit 14 by means of the lever 11 is accomplished by movement of a differential lever 15 that is pivoted at one end at 16 to a segment member 17. The other end of the link has movement imparted to it by the lever 11 through a link 18. As the lever 15 is moved it raises or lowers a driving link 19 whose lower end is pivoted at a three armed lever 21 that is in turn pivoted at 22. As the arm 21 moves it adjusts a flapper 23, which is pivoted at 24, relative to a nozzle 25 to vary the back pressure in this nozzle. This is accomplished by means of a pin 26 that projects from one of the arms of the lever 21 into the path of the flapper 24.

Movement of the flapper relative to the nozzle produces, through a pilot valve 27, a pressure change in chamber 28 of the unit to give a reverse or follow-up movement to the flapper 24 and a third or compensating movement, which is generally known as reset, that is in the same direction as the original flapper movement. The pressure in the chamber 28 acts through a pair of liquid filled bellows 29 and 31 to move a rod 32. If the pressure in the chamber 28 has been increased as a result of a flapper movement to the left, the rod 32 will move to the right. This rod acts through a pin 33 on the rod, a lever 34, second pin 35 and a lever 36 upon which the three arm lever 21 is pivoted to move the latter to the right and thereby move the flapper away from the nozzle 24. The amount of this movement for a given movement of the rod 32 can be varied by shifting the pin 35 upwardly or downwardly between the levers 34 and 36.

The third or reset movement of the flapper is accomplished as the liquid flows from between bellows 29 and 31 to another liquid filled chamber that is formed between a pair of bellows 38 and 39 on the right portion of the instrument. The liquid flows from its left chamber to its right chamber through a pipe 41 that has in it an adjustable valve 42. The speed of movement of the rod 32 is determined by the strength of a pair of springs 30 which tend to return it to its midposition and the opening of the valve 42.

The pilot valve 27, which is above referred to is supplied with air from the main supply pipe 43. This pipe has a branch 45 that leads to the nozzle 25 and which also communicates with a chamber 46 in the pilot valve. Pipe 45 is connected with pipe 43 through a restriction 44. One wall of chamber 46 is formed by a bellows 47 which will collapse or expand depending upon whether the pressure in the chamber 46 is increased or decreased. As the bellows 47 moves, a nozzle 48 which is attached thereto is also moved. This nozzle is in communication with the atmosphere through a chamber formed between the bellows 48 and a second and smaller bellows 49. As the nozzle 48 moves it serves to vary the air pressure in a chamber 51 of the pilot valve by moving a valve 52 away from an air inlet 53 or by moving itself away from the valve 52. In operation, an increase in pressure in the chamber 46 will move the nozzle 48 downwardly and thereby move the valve 52 in a clockwise-direciton to permit more air to flow into the chamber 51 through the inlet 53. This increase in pressure will be applied to the interior of bellows 49 to expand that bellows to bring the nozzle 48 back to its neutral position, and will also be applied through a pipe 54 to the diaphgram of valve 3. If the pressure in the chamber 46 had been decreased the bellows 47 would have expanded to move nozzle 48 away from valve 52 to permit the escape of air to the atmosphere. The pilot valve permits an increase in pressure applied to the valve 3 over that applied in the chamber 41 in direct proportion to the ratio of the areas of bellows 47 and 49.

The air which is applied through the pipe 54 to the valve 3 is also applied through pipe 55, a conventional three-way solenoid valve 56 and pipe 57 to the chamber 28. Air can also be applied to the chamber 28 from a supply pipe 58 through a manually operated pressure regulator 59 and the valve 56, if the valve is so positioned that it connects the pipe 57 and the pipe 58. In normal operation, however, the valve 56 is so positioned that 55 is connected to 57 and the pressure in 58 has no effect on the device.

The pipe 54 is also connected to a pair of pressure actuated switch units 61 and 62 which are identical in construction and which respond to variations in pressure applied in the pipe 54. Each of these switch units comprises a bellows 63 to which the pressure is applied and a switch supporting lever 64 that it pivoted at 65 and which pivot may be raised and lowered by means of a screw 66. If for example the pivot 65 of the arm 64 in unit 61 is raised a greater pressure will be needed in bellows 63 to move the switch supporting arm to a given position in a counterclockwise direction than would be needed in the position shown. The switch units are identical, except that the switch 68 in unit 61 will be closed upon an increase in pressure in bellows 63 in that unit, whereas the switch 69 in unit 62 will be opened upon an increase in pressure in the bellows 63 in that unit. These switches, along with a solenoid operated switch 71, control the operation of the solenoid valve 56. The switch 71 is closed by means of a push button switch 72 that completes a circuit through a solenoid 73 of the switch. There is also provided a manually operated switch 74 which can connect the unit 61 or the unit 62 in a circuit in a manner presently to be described.

In the normal operation of the instrument with the parts in the position shown, the control unit will tend to maintain the temperature in the heater 1 at a given value. In order to change the value of the temperature in the heater the pivot point 16 of the differential lever 15 is raised or lowered so that the normal position of the flapper for a given position of the lever 11 will be changed. This is accomplished by rotating a pinion 75 to move the segment member 17 around its pivot 76. This same movement moves an indicator arm 77, which is attached to the segment 17, across a chart, not shown, to indicate the value at which the condition is to be maintained.

In the operation of the instrument, an increase in temperature of the heater 1 will operate through the lever system described to permit flapper 24 to move toward nozzle 25 and throttle the flow of air escaping therefrom. As a result of this, pressure will be increased in the pipe 45 and chamber 46 of pilot valve 27 to move nozzle 48 downwardly. This moves valve 52 away from inlet 53 so that the pressure may increase in chamber 51, pipe 54 and on the diaphragm of valve 3 to close the same and reduce the supply of heating medium to the heater 1.

This same pressure increase serves to give a follow-up action to the instrument by air applied through pipe 55, valve 56 and pipe 57 to chamber 28. As the pressure in the chamber increases the bellows 29 collapses, and acting through the liquid, collapses the bellows 31 to move rod 32 to the right. The movement of the rod is transferred through the levers, above described, to move flapper 24 away from the nozzle 25 and stop the pressure increase in the system. So far the action of the instrument and the pressure change is proportional to the deviation of the temperature from the control point. The amount that the temperature may deviate before the pressure is changed sufficiently to fully open or close the valve 3 depends upon the throttling range of the instrument, and this may be changed by shifting pin 35 along levers 34 and 36.

A third or reset action follows the follow-up movement just described. This takes place as the rod 32 moves back toward its original, neutral position under the action of the springs 30 on each of its ends. This reset action takes place at a rate depending upon the opening of restriction 42 in pipe 41 as liquid is forced from one of the liquid filled bellows chambers to the other.

Such a movement tends to change the pressure of the control air in a direction similar to its original change and opposite to the follow-up change and continues as long as the temperature of the heater is away from the control point. Depending upon the amount of the temperature change and the length of time that it is away from the control point the reset-action may continue for an hour or two hours. During this time the reset will "pile up" and cause severe cycling unless some means is provided to control it.

The same action takes place when the control point of the instrument is changed, as is frequently done in some processes. The reset action will continue to pile up until the new control point is reached. Then overshooting and fluctuation of the temperature will occur as the reset action dissipates itself.

If the ultimate control pressure needed at the new control point can be predetermined to a reasonably close degree and this pressure applied to the chamber 28 during the time the temperature is coming to its new control point, the cumulative effects of the reset may be overcome. If the control point of the instrument is frequently changed to set values, the operator soon learns the control pressure that is normally required on the valve for a given temperature at a given load. For this reason the pressure regulator 59 may be used to adjust the pressure of the air supplied through pipe 58. This pressure is adjusted to be equal to that which will be applied to the valve after a control point adjustment has taken place and the temperature settled out at its new value. When the control point of the instrument is shifted the valve 56 is adjusted to shut off communication between pipes 55 and 57 and to place pipes 57 and 58 in communication. When the temperature of the heater has reached its new value, the valve 56 is shifted back to its normal position.

The above operation may be accomplished automatically in the following manner. Assume, for example, that the control point of the instrument is increased so that the temperature of the heater 1 is raised to some higher value. In order to let the valve 3 open wider to maintain this higher temperature a lower control pressure will be needed in the system. The operator will then adjust the pressure regulator 59 so that the air pressure supplied through the pipe 58 will be substantially equal to that which the instrument will eventually set up at the new temperature. This pressure will be shown on gauge 78. The switch 74 will also be moved to the position shown, and the switch unit 62 will be adjusted so that switch 69 will open when the pressure in the system has reached that for which regulator 59 has been set. Thereafter, the operator will first adjust the control point of the instrument by rotating knob 75 until pointer 77 has moved to the desired position, and next will push the switch button 72 to close that switch, and energize solenoid 73. This closes switch 71 so that the solenoid of valve 56 will be energized to disconnect pipe 55 from and connect pipe 58 to pipe 57.

When the control point of the instrument is adjusted upwardly differential lever 15 is moved counter-lockwise around the lower end of link 18 as a pivot. This raises link 19 to rotate lever 21 in a direction to move flapper 24 away from the nozzle 25. Immediately the pressure in the entire system decreases so that the valve 3 can open wide and so that the bellows 63 in the switch unit 62 can collapse enough to permit the mercury switch 69 to close. A holding circuit for the solenoid 73 is then completed through that solenoid, switch 69, switch 74 and switch 71, so that the solenoid for valve 56 will remain energized.

Disconnecting the control air pressure from the chamber 28 in effect renders the control action of the instrument on-off so that the control pressure will remain low and the temperature of the heater will rapidly rise. When the temperature of the heater has approximately reached the new control point the control pressure in the system will be approximately equal to the final pressure which has been anticipated by the setting of regulator 59. When that pressure has been reached switch 69 will be opened to deenergize solenoid 73 so that switch 71 will open to deenergize the solenoid of valve 56. The pipes 55 and 57 are again connected and the instrument again functions in its normal fashion. Since the reset mechanism has not been subjected to the change in pressure encountered when the heater temperature was raised the instrument can immediately function in its normal manner with a minimum of overshooting and hunting of the heater temperature.

If the control point of the instrument had been decreased a similar procedure would have been followed. In this case, however, the switch 74 will be moved to its lower position to connect switch 68 in the circuit instead of switch 69. When the control point of the instrument is lowered, the effect is to increase the control pressure in the system. When the new, lower temperature has been reached pressure in the system will reduce to a point where switch 68 of switch unit 61 will open to deenergize the solenoid of valve 56 to return the system to its normal type of control.

Ordinarily when a process requires its control point to be changed frequently the changes are from one given value to another given value. This means that when the switch units 61 and 62 have once been set it will not again be necessary to adjust them. If the control point is adjusted to more than two different points it may be convenient to have more than two of the switch units, one for each control point adjustment. It is noted that in some cases it may be desirable to keep the same pressure in chamber 28 that was present prior to the time a control point adjustment took place. This can be accomplished by adjusting the pressure regulator 59 until the pressure indicated by the pressure gauge 78 connected to pipe 58 is the same as the pressure indicated by a gauge 79. This latter gauge indicates the pressure applied to the valve 3 or the control pressure of the system. The pressure of the air supplied to the instrument is indicated by a gauge 81.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use or other features.

Having now described this invention, what I claim as new and desire to secure by Letters Patent is:

1. In an air control system, the combination of an air control unit having follow-up and reset mechanism and control point adjusting mechanism, a supply of air under pressure, said control unit having means operative to adjust said supply of air in accordance with the control point adjustment thereof, means to apply said adjusted air supply to said follow-up and reset mechanism, means to disconnect said adjusted supply of air from said follow-up and reset mechanism and apply a second air pressure thereto, and means to adjust said disconnecting means to reconnect said adjusted supply of air to said follow up and reset mechanism upon the attainment of a predetermined value of the pressure of said adjusted supply of air.

2. In an air control system, the combination of an air control unit having follow-up and reset mechanism, means to adjust said control unit to change the value at which it will tend to maintain a variable condition, a supply of air under pressure, means forming part of said control unit to adjust the pressure of said supply of air in accordance with the control point adjustment of the unit, means to apply said adjusted air supply to said follow-up and reset mechanism, means to disconnect said air pressure from said follow-up and reset mechanism and apply a second air pressure thereto, and means to adjust said disconnecting means to reconnect said adjusted supply of air to said follow up and reset mechanism upon the attainment of a predetermined pressure of said adjusted air supply.

3. In an air control system, a supply of air under pressure, an air control instrument having follow-up and reset mechanism, means operated by said control unit to adjust the pressure of said supply of air in accordance with the value at which a variable condition is to be maintained, means to apply said adjusted supply of air to said follow-up and reset mechanism, means to disconnect said adjusted supply from said follow-up and reset mechanism and apply a second air pressure thereto, manually operated means to adjust said disconnecting means to disconnect said adjusted supply of air from said follow-up and reset mechanism and means responsive to said adjusted supply of air when the pressure thereof reaches a predetermined value to adjust said disconnecting means to reconnect said adjusted supply of air to said follow up and reset mechanism.

4. In an air control system, an air control unit having follow-up and reset mechanism, a supply of air under pressure, means operated by said control unit to adjust the pressure of said supply of air to various values depending upon the value at which a condition is to be maintained, means to adjust said control unit to vary the value of a condition being controlled by it from a first value to a second value, means to remove the effect of said follow-up and reset mechanism due to the changing air pressure produced by said control unit while it is changing the value of the condition from the first to the second value, and means responsive to the pressure of said adjusted supply of air when said pressure is substantially equal to the value it assumes when the condition is at its second value to return the effects of said follow-up and reset mechanism to said control unit.

5. In an air control system, an air control unit having follow-up and reset mechanism, means to adjust said unit in response to variations in the value of a condition from a given value, means to adjust said control unit so that it will vary the condition from a first value to a second value different from the first value, means to remove the effect of said follow-up and reset mechanism due to the changing air pressure produced by the said control unit during the time said control unit is changing the condition from the first value to the second value, and means to return the effect of said follow-up and reset mechanism to said control unit when the condition has substantially reached the second value.

6. In an air control system, an air control unit having follow-up and reset mechanism, a supply of air under pressure, means operated by said control unit to adjust the pressure of air to various values in accordance with the value at which it is desired to maintain a variable condition, means to apply said adjusted supply of air to said follow-up and reset mechanism, a second supply of air under pressure, manually operated means to adjust the pressure of said second supply of air, means operative to apply said second adjusted supply of air to said follow-up and reset mechanism, valve means operative to determine which of said supplies of air is applied to said follow-up and reset mechanism and normally operative to direct said first supply of air thereto, manually operated means to adjust said valve to a position in which it directs said second supply of air to said follow-up and reset mechanism, and means operated in response to the attainment of a predetermined pressure of said first supply of air to operate said valve to direct said first supply of air to said follow-up and reset mechanism.

7. In an air control system, an air control unit having follow-up and reset mechanism, a first supply of air under pressure, means operated by said control unit to adjust the pressure of said first supply of air to a value in accordance with the value at which it is desired to maintain a condition, a second supply of air under pressure, manually operated means to adjust said second supply of air, means to apply alternately said supplies of air to said follow-up and reset mechanism, manually operated means to adjust said means to apply to a position in which said second supply of air is applied to said follow-up and reset mechanism, and means responsive to the pressure of said first supply of air and operative when the pressure thereof is substantially equal to that of said second supply of air to adjust said means to apply in a direction to apply said first adjusted supply of air to said follow-up and reset mechanism.

8. In an air control system, an air control unit having follow-up and reset provisions, a supply of air under pressure, means operated by said control unit to adjust the pressure of said supply of air to different values depending upon the value at which said unit is maintaining the value of a variable condition, a second supply of air under pressure, means to manually adjust said second supply of air to a pressure substantially equal to that which said control unit will produce in said first supply of air when the unit is controlling a condition at a given value, means including a valve to direct one or the other of said adjusted supplies of air to said follow-up and reset mechanism, manually operated means to move said valve to a position to apply said second adjusted supply of air to said follow-up and reset mechanism, and pressure responsive means operated by said first adjusted supply of air when its pressure is substantially equal to the pressure of said second supply of air to move said valve to a position to apply said first supply of air to said follow-up and reset mechanism.

WILLIAM L. McGRATH.

REFERENCES CITED

The following references are of record in the file of this patent:

UNITED STATES PATENTS

| Number | Name | Date |
|---|---|---|
| 2,202,218 | Mallory | May 28, 1940 |